(12) United States Patent
Kitano

(10) Patent No.: US 11,518,199 B2
(45) Date of Patent: Dec. 6, 2022

(54) PNEUMATIC TIRE

(71) Applicant: Sumitomo Rubber Industries, Ltd., Kobe (JP)

(72) Inventor: Tetsuya Kitano, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 39 days.

(21) Appl. No.: 17/189,760

(22) Filed: Mar. 2, 2021

(65) Prior Publication Data

US 2021/0301429 A1    Sep. 30, 2021

(30) Foreign Application Priority Data

Mar. 24, 2020    (JP) .............................. JP2020-053037

(51) Int. Cl.
| | |
|---|---|
| *B60C 15/024* | (2006.01) |
| *B60C 13/02* | (2006.01) |
| *D02G 3/48* | (2006.01) |
| *B60C 9/00* | (2006.01) |
| *B60C 9/20* | (2006.01) |
| *B60C 9/08* | (2006.01) |

(52) U.S. Cl.
CPC ............ *B60C 15/024* (2013.01); *B60C 13/02* (2013.01); *B60C 9/005* (2013.01); *B60C 9/0042* (2013.01); *B60C 9/08* (2013.01); *B60C 9/2003* (2013.01); *B60C 2009/2035* (2013.01); *B60C 2200/04* (2013.01); *D02G 3/48* (2013.01)

(58) Field of Classification Search
CPC ..... B60C 13/001; B60C 13/05; B60C 13/023; B60C 13/02; B60C 15/0628
See application file for complete search history.

(56) References Cited

U.S. PATENT DOCUMENTS

| | | | | |
|---|---|---|---|---|
| 4,700,764 | A * | 10/1987 | Endo ....................... | B60C 15/06 152/526 |
| 5,573,612 | A * | 11/1996 | Tagashira .............. | B60C 15/024 152/543 |
| 2011/0108174 | A1* | 5/2011 | Takahashi ............... | B60C 13/02 152/153 |

FOREIGN PATENT DOCUMENTS

| | | | |
|---|---|---|---|
| DE | 102015207714 | * | 10/2016 |
| JP | 2015-123942 | * | 7/2015 |
| JP | 2018-111433 A | | 7/2018 |

OTHER PUBLICATIONS

Machine translation of DE 102015207714, 2016.*
Machine translation of JP 2015-123942, 2015.*

* cited by examiner

*Primary Examiner* — Justin R Fischer
(74) *Attorney, Agent, or Firm* — Birch, Stewart, Kolasch & Birch, LLP

(57) ABSTRACT

A pneumatic tire includes a pair of bead portions each having a respective bead core therein, a carcass extending between the bead portions and including a carcass ply that includes a main portion extending between the bead cores and a pair of turn-up portions turned up around the bead cores, and a pair of bead reinforcing layers being disposed outward in the tire axial direction of the turn-up portions so as to cover outermost ends in a tire radial direction of the turn-up portions. An outer surface of at least one of the bead portions is provided with a recess row including a plurality of recesses spaced in a tire circumferential direction, and in the at least one of the bead portions, an outermost end of the bead reinforcing layer is located outwardly in the tire radial direction of outermost ends of the plurality of recesses.

19 Claims, 4 Drawing Sheets

PNEUMATIC TIRE

CROSS-REFERENCE TO RELATED APPLICATIONS

This application claims the benefit of foreign priority to Japanese Patent Application No. JP2020-053037, filed Mar. 24, 2020, which is incorporated by reference in its entirety.

BACKGROUND ART

Field of the Disclosure

The present disclosure relates to a pneumatic tire, and more specifically relates to a pneumatic tire for automobile.

Description of the Related Art

The following Patent document 1 discloses a heavy-duty pneumatic tire directed to improve bead durability. The heavy-duty pneumatic tire includes a reinforcing layer of an organic fiber cord ply disposed outside a turn-up portion of each bead portion.

PATENT DOCUMENT

[Patent document 1] Japanese Unexamined Patent Application Publication 2018-111433

SUMMARY OF THE DISCLOSURE

Unfortunately, when the reinforcing layers are provided on the bead portions, strain tends to concentrate near the outermost ends of the reinforcing layers in the tire radial direction during driving, and as a result, these portions tend to become a starting point of damage such as ply loose.

The inventor, through diligent research, has found that such a damage in the vicinity of the reinforcing layers can be suppressed by generating a turbulent flow around the one or more bead portions when the tire is running to cool the vicinity of the outermost ends of the reinforcing layer.

The present disclosure has been made in view of the above circumstances and has a major object to provide a pneumatic tire capable of improving bead durability.

In one aspect of the disclosure, a pneumatic tire includes a pair of bead portions each having a respective bead core therein, a carcass extending between the pair of bead portions, the carcass including a carcass ply of cords including a main portion extending between the bead cores and a pair of turn-up portions turned up around the bead cores from inside to outside in a tire axial direction, and a pair of bead reinforcing layers being disposed outward in the tire axial direction of the pair of turn-up portions in the pair of bead portions such that the pair of bead reinforcing layers extend in a tire radial direction so as to cover outermost ends in a tire radial direction of the pair of turn-up portions. An outer surface in the tire axial direction of at least one of the pair of bead portions is provided with a recess row including a plurality of recesses spaced in a tire circumferential direction, and in the at least one of the pair of bead portions, an outermost end of the bead reinforcing layer is located outwardly in the tire radial direction of outermost ends of the plurality of recesses.

In another aspect of the disclosure, the pair of bead reinforcing layers may include a nylon cord ply that includes a plurality of nylon cords coated with a topping rubber.

In another aspect of the disclosure, the plurality of recesses may be spaced at a regular interval in the tire circumferential direction.

In another aspect of the disclosure, a depth h of the plurality of recesses may be in a range from 1.0 to 5.0 mm.

In another aspect of the disclosure, the recess row may be located inwardly in the tire radial direction of a tire maximum width position.

In another aspect of the disclosure, a ratio (P/h) of a pitch (P) in the tire circumferential direction of the plurality of recesses to a depth (h) of the plurality of recesses may be in a range from 1.0 to 30.0.

In another aspect of the disclosure, in the at least one of the pair of bead portions, a distance in the tire radial direction between the outermost end of the bead reinforcing layer and the outermost ends of the plurality of recesses may be equal to or more than 3.0 mm.

In another aspect of the disclosure, each of the pair of bead reinforcing layers may include a first reinforcing layer and a second reinforcing layer, and an outermost end in the tire radial direction of the second reinforcing layer may be located inwardly in the tire radial direction of an outermost end in the tire radial direction of the first reinforcing layer.

In another aspect of the disclosure, in the at least one of the pair of bead portions, the outermost end of the second reinforcing layer or the outermost end of the turn-up portion may overlap the plurality of recesses in the tire radial direction.

In another aspect of the disclosure, the first reinforcing layer may be disposed outwardly in the tire axial direction of the second reinforcing layer.

In another aspect of the disclosure, the recess row may include an outer recess row and an inner recess row located inwardly in the tire radial direction of the outer recess row, and a plurality of recesses of the outer recess row may be staggered in the tire circumferential direction with respect to a plurality of recesses of the inner recess row.

In another aspect of the disclosure, the pneumatic tire may be a heavy-duty pneumatic tire.

DESCRIPTION OF THE PREFERRED EMBODIMENTS

Figure 1:
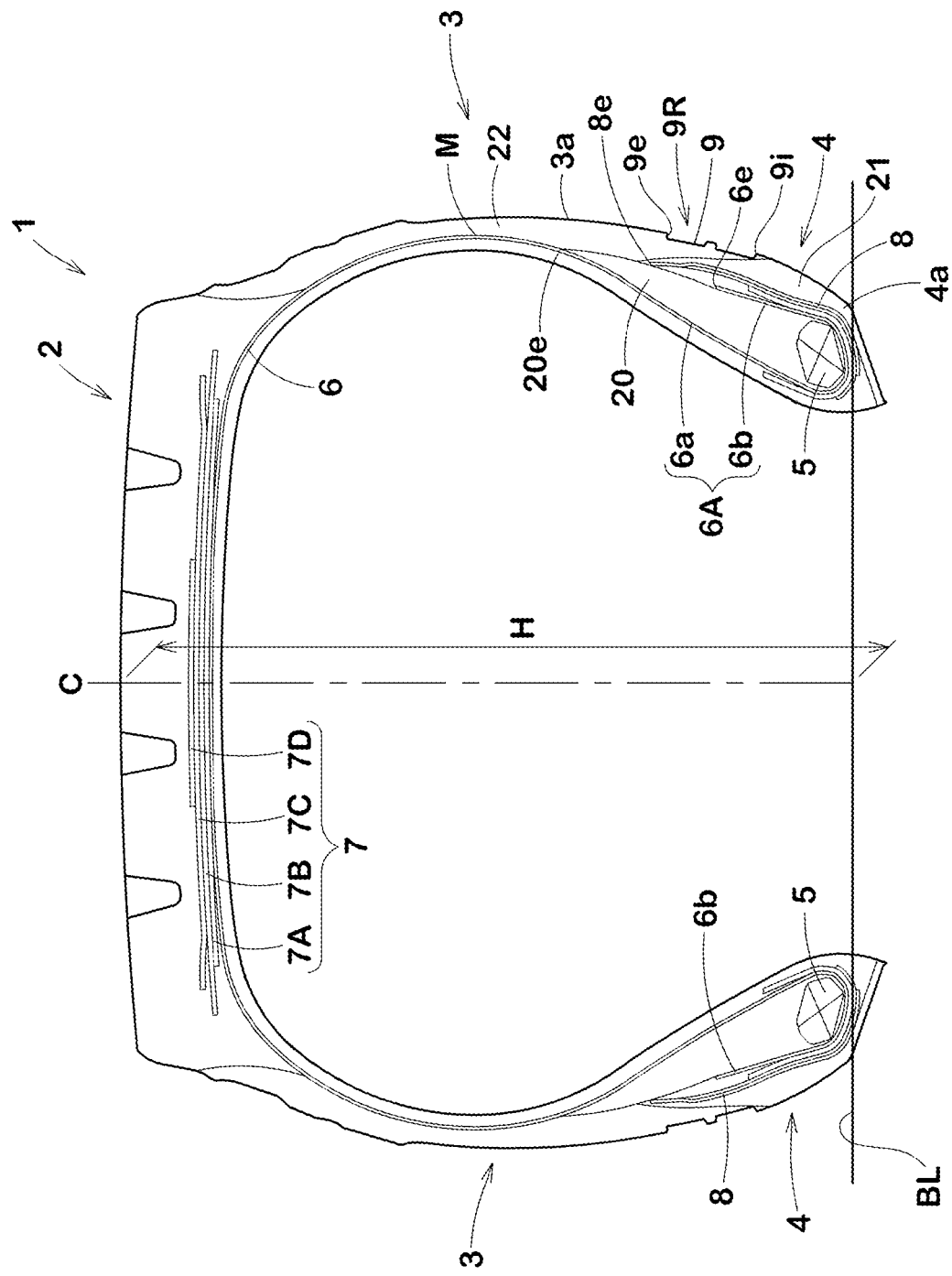
FIG. 1 is a cross-sectional view of a pneumatic tire according to an embodiment of the disclosure.

An embodiment of the present disclosure will be explained below with reference to the accompanying drawings. FIG. 1 is a cross-sectional view of a pneumatic tire (hereinafter simply referred to as "tire") 1 under a normal state according to an embodiment of the disclosure. In FIG. 1, a pneumatic tire for heavy-duty vehicle is illustrated. Alternatively, the present disclosure may be embodied as other category tires such as pneumatic tires for light truck and passenger car.

As used herein the "normal state" is such that the tire 1 is mounted onto a standard wheel rim (not illustrated) with a standard pressure but loaded with no tire load. Unless otherwise noted, dimensions of portions of the tire 1 are values measured under the normal state.

As used herein, the "standard wheel rim" is a wheel rim officially approved for each tire by standards organizations on which the tire is based, wherein the standard wheel rim is the "standard rim" specified in JATMA, the "Design Rim" in TRA, and the "Measuring Rim" in ETRTO, for example.

As used herein, the "standard pressure" is a standard pressure officially approved for each tire by standards organizations on which the tire is based, wherein the standard pressure is the "maximum air pressure" in JATMA, the maximum pressure given in the "Tire Load Limits at Various Cold Inflation Pressures" table in TRA, and the "Inflation Pressure" in ETRTO, for example.

As illustrated in FIG. 1, the tire 1 according to the present disclosure includes a pair of bead portions 4 each having a respective bead core 5 therein, a carcass 6 extending between the pair of bead portions 4, and a pair of bead reinforcing layers 8 each disposed in a respective one of the bead portions 4.

The carcass 6 includes a carcass ply 6A of cords which includes a main portion 6a extending between the bead cores 5 and 5, and a pair of turn-up portions 6b each turned up around a respective one of the bead cores 5 from inside to outside in the tire axial direction.

The pair of bead reinforcing layers 8 each are disposed outward in the tire axial direction of the turn-up portion 6b in a respective one of the bead portions 4 such that the bead reinforcing layers 8 extend in the tire radial direction so as to cover outermost ends 6e in the tire radial direction of the turn-up portions 6b. The bead reinforcing layers 8 can suppress separation of the turn-up portions 6b, improving durability of the bead portions 4.

Figure 2:
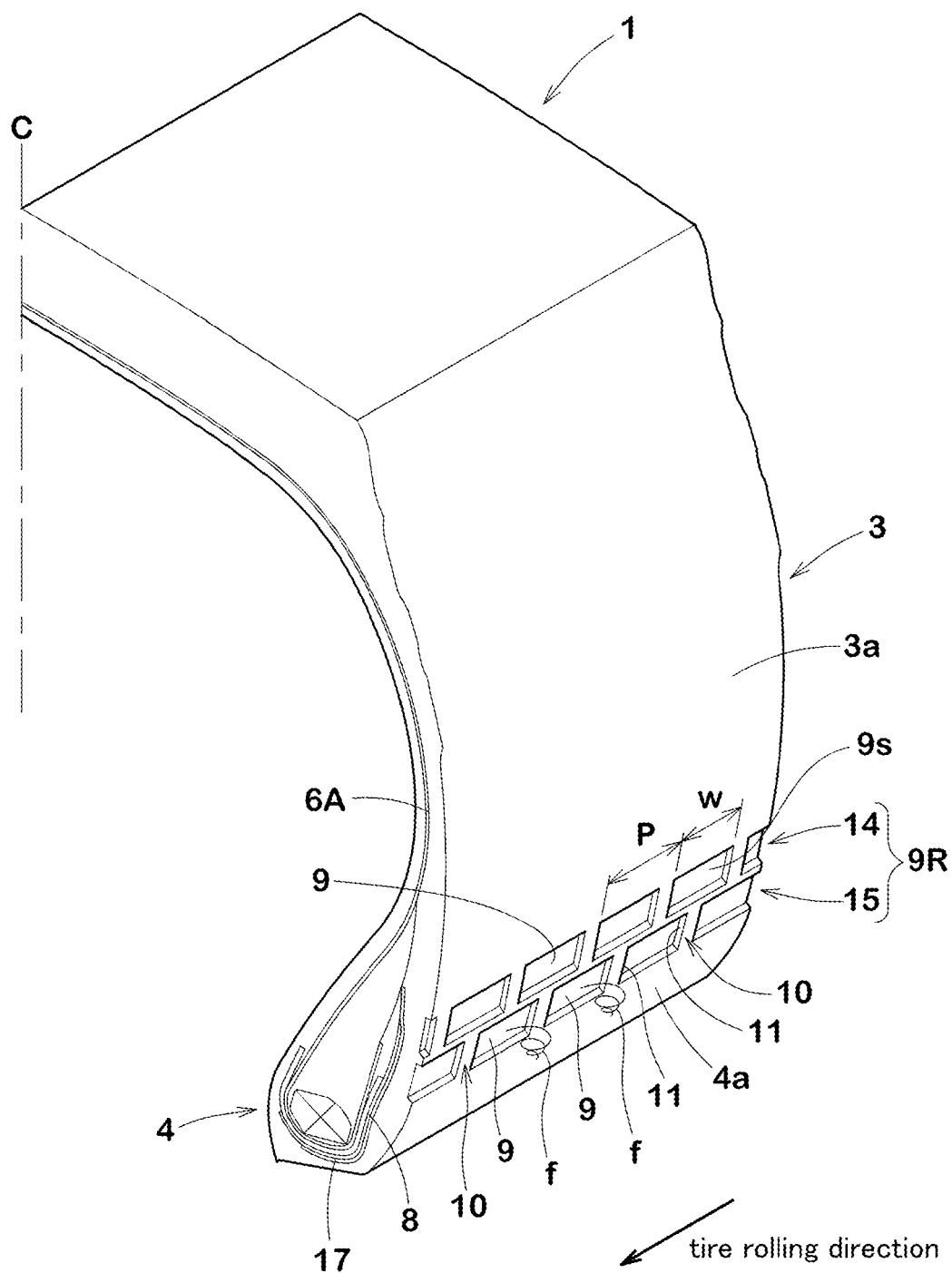
FIG. 2 is a partial perspective view of the pneumatic tire of FIG. 1.

FIG. 2 is a partial perspective view of the tire 1 of FIG. 1. As illustrated in FIG. 2, in the tire 1 according to the present disclosure, an outer surface 4a in the tire axial direction of at least one of the pair of bead portions 4 is provided with a recess row 9R which includes a plurality of recesses 9 spaced in the tire circumferential direction. In the present embodiment, the recess row 9R is provided on the respective bead portions (as shown in FIG. 1). Such a recess row 9R can generate turbulent flow f on or around the outer surface 4a of the bead portion 4 when the tire 1 is running. The turbulent flow f takes in low-temperature air from the outside of the tire 1 onto the outer surface 4a of the bead portion 4. Then, the low-temperature air moves outwardly in the tire radial direction along the outer surface 4a by the centrifugal force due to the rotation of the tire, and can cool an outer region in the tire radial direction of the recess row 9R.

Figure 3:
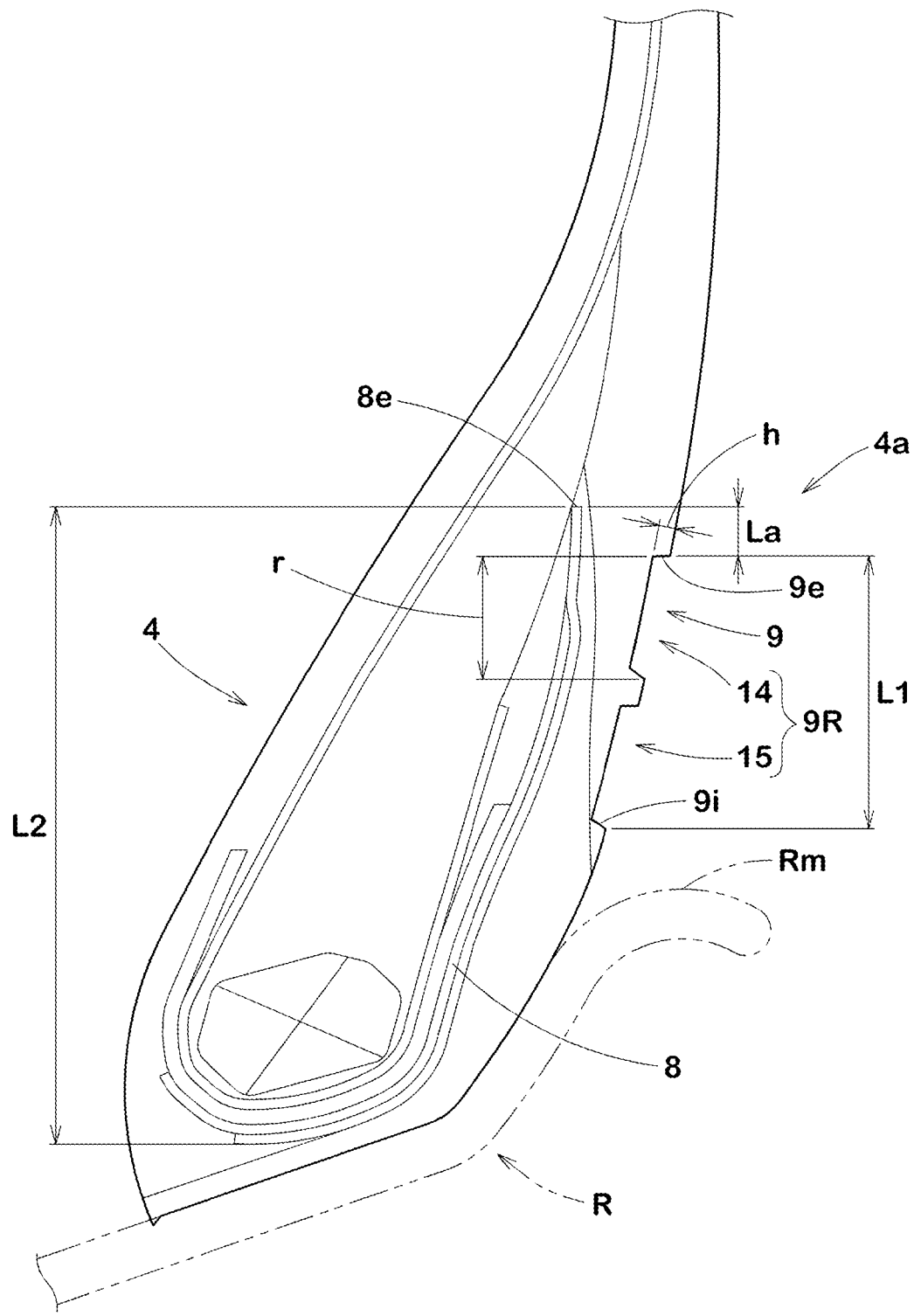
FIGS. 3 and 4 are partial enlarged views of FIG. 1.

FIG. 3 is a partial enlarged view of one of the bead portions 4. As illustrated in FIG. 3, in each bead portion 4, an outermost end 8e in the tire radial direction of the bead reinforcing layer 8 is located outward in the tire radial direction of the outermost end 9e in the tire radial direction of the plurality of recesses 9. Thus, the low-temperature air cools the outermost end 8e of the bead reinforcing layer 8 and suppresses damage thereto. Therefore, the tire 1 according to the present embodiment can improve durability of the bead portions 4.

In order to further improve the above-mentioned effect, in each bead portion 4, a distance La in the tire radial direction between the outermost end 8e of the bead reinforcing layer 8 and the outermost ends 9e of the plurality of recesses 9 is preferably equal to or more than 3.0 mm. On the other hand, when the distance La becomes too long, the cooling effect of the bead reinforcing layers 8 on the outermost end 8e may be reduced. Thus, the distance La is preferably 10.0 mm or less.

Preferably, a distance L1 in the tire radial direction between the outermost ends 9e of the recesses 9 and innermost ends 9i of the recesses 9 is in a range of from 35% to 55% a length L2 in the tire radial direction of the bead reinforcing layer 8, for example. When the distance L1 is equal to or more than 35% the length L2 of the bead reinforcing layer 8, damage of the bead reinforcing layers 8 can be prevented effectively. Also, when the distance L1 is equal to or less than 55% the length L2 of the bead reinforcing layer 8, reduction in stiffness of the bead portions 4 can be prevented.

When the tire 1 is mounted onto the standard wheel rim R, the innermost end 9i of the recesses 9, for example, is located outward in the tire radial direction of the outermost end Rm of the standard wheel rim R.

Preferably, a depth h of the recesses 9 is in a range of from 1.0 to 5.0 mm. When the depth h is equal to or more than 1.0 mm, the recesses 9 can generate turbulence air flow around the outer surface 4a effectively. When the depth h is equal to or less than 5.0 mm, rolling resistance of the tire 1 can be maintained high without generating excessively large turbulence as well as prevent reduction in stiffness of the bead portions 4. From these viewpoints, the depth h is preferably equal to or more than 2.0 mm, but preferably equal to or less than 4.0 mm.

In the present embodiment, the recess row 9R is located inwardly in the tire radial direction of the tire maximum width position M (shown in FIG. 1). Such a recess row 9R can help to reduce heat generation of the bead portions 4. Further, this feature makes it possible to reduce rotational resistance of the tire, lowering rolling resistance of the tire, as compared to a tire that is provided with recesses located outward in the tire radial direction of the tire maximum width position M. As used herein, the tire maximum width position M is the position where the main portion 6a of the carcass ply 6A is located outermost in the tire axial direction.

In the present embodiment, the plurality of recesses 9 of the recess row 9R is spaced at a regular interval in the tire circumferential direction. As a result, the outer surface 4a of the bead portion 4 can be effectively cooled. Note that the "regular interval" means not only the same interval in the dictionary sense, but also "substantially regular interval" where the difference (Px-Pi) between a maximum interval Px and a minimum interval Pi is 0.2 times or less the maximum interval Px.

As illustrated in FIG. 2, the recess row 9R, for example, includes the recesses 9 and smoothing portions 10 formed between the adjacent recesses 9 in the tire circumferential direction, and the recesses 9 and the smoothing portions 10 are alternated in the tire circumferential direction. The smoothing portions 10, for example, are formed so as to be continuous to an outer surface 3a of a pair of sidewall portions 3 smoothly. Note that the recess row 9R is not limited to such an aspect.

In a tire side view, each recess 9, in the present embodiment, is formed into a rectangular shape which includes a pair of longitudinal edges 11 extending along the tire radial direction. Such a pair of longitudinal edges 11 of each recess 9 can generate turbulent flow f effectively when the tire rotates. Note that the shape of the recesses 9 is not limited to a rectangular shape, but can employ other shapes, e.g., circular shape, oval shape, triangular shape and the like.

Preferably, a ratio (P/h) of a pitch (P) in the tire circumferential direction of the plurality of recesses 9 to the depth (h) of the plurality of recesses 9 is in a range from 1.0 to 30.0. By setting the ratio (P/h) to the above range, turbulent flow f can be generated around the outer surfaces 4a of the bead portions 4 effectively. The ratio (P/h) is preferably equal to or more than 3.0, more preferably equal to or more than 5.0. The ratio (P/h) is preferably equal to or less than 25.0, more preferably equal to or less than 20.0.

Preferably a ratio (w/P) of a length w in the tire circumferential direction of the recesses 9 to the pitch (P) in the tire circumferential direction of the plurality of recesses 9, for example, is in a range of from 0.60 to 0.90. When the ratio (w/P) is 0.60 or more, turbulent flow f can be generated effectively. In addition, the ratio (w/P) is 0.90 or less, reduction in stiffness of the bead portions 4 can be prevented. In order to further improve the above-mentioned effects, the ratio (w/P) is more preferably equal to or more than 0.70, but preferably equal to or less than 0.80.

In order to achieve the same effect as mentioned above, a ratio (h/w) of the depth h of the plurality of recesses 9 to the length w in the tire circumferential direction of the recesses 9, for example, is preferably equal to or more than 0.03, more preferably equal to or more than 0.05. Further, the ratio (h/w), for example, is preferably equal to or less than 0.10, more preferably equal to or less than 0.08. Furthermore, a ratio (r/w) of a length r in the tire radial direction of the recesses 9 (shown in FIG. 3) to the length w in the tire circumferential direction of the recesses 9, for example, is equal to or more than 0.25, more preferably equal to or more than 0.30, but preferably equal to or less than 0.55, more preferably equal to or less than 0.50.

In the present embodiment, the recess row 9R includes an outer recess row 14 and an inner recess row 15 that is located inwardly in the tire radial direction of the outer recess row 14. In the present embodiment, a plurality of recesses 9 of the outer recess row 14 is staggered in the tire circumferential direction with respect to a plurality of recesses 9 of the inner recess row 15. By such an arrangement, reduction in stiffness of the bead portions 4 may be prevented. The recesses 9 in the outer recess row 14 and the recesses 9 of the inner recess row 15 are the same number in this embodiment.

The carcass ply 6A, in the present embodiment, includes carcass cords oriented at an angle equal to or more than 70 degrees with respect to the tire equator C and a topping rubber coating the carcass cords. As to the carcass cords, organic fiber cords such as nylon, polyester or rayon, or steel cords can be used, for example.

Each bead reinforcing layer 8, in the present embodiment, is a nylon cord ply 17 that includes a plurality of nylon cords coated with a topping rubber. Complex modulus $E^*1$ of the topping rubber of each bead reinforcing layer 8, for example, is equal to, smaller than, or greater than complex modulus $E^*2$ of the topping rubber of the carcass ply 6A. Preferably, the complex modulus $E^*1$ of the topping rubber of the bead reinforcing layer 8, for example, is equal to or more than 3.0 MPa, more preferably equal to or more than 5.0 MPa, but preferably equal to or less than 8.0 MPa, more preferably equal to or less than 7.0 MPa. As used herein, complex modulus means a value of complex modulus measured using a visco-elastic spectrometer made of IWAMOTO SEISAKUSHO under the following conditions based on JIS K6394:

initial strain: 10%;
amplitude: plus/minus 2%;
frequency: 10 Hz;
deformation mode: tensile; and
temperature: 70 degrees C.

Figure 4:
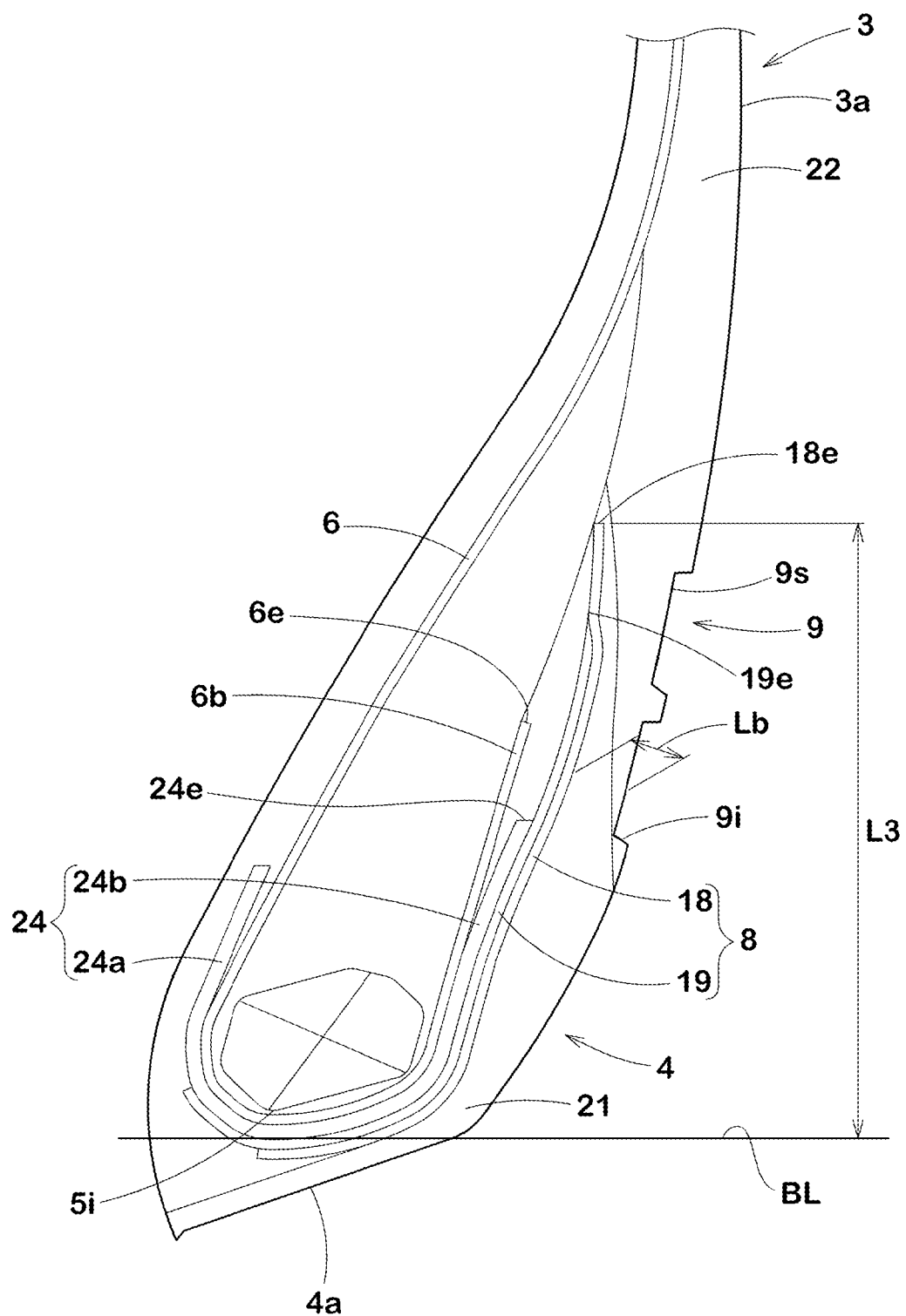

FIG. 4 illustrates a partial enlarged view of one of the bead portions 4. As illustrated in FIG. 4, each bead reinforcing layer 8 according to the present embodiment includes a first reinforcing layer 18 and a second reinforcing layer 19. An outermost end 19e in the tire radial direction of the second reinforcing layer 19, for example, is located inwardly in the tire radial direction of an outermost end 18e in the tire radial direction of the first reinforcing layer 18. In this way, since the locations of the outermost ends 18e and 19e are displaced in the tire radial direction, forming rigidity step that causes rigidity of the bead portion 4 to change significantly in the tire radial direction can be prevented, improving durability of the bead portions 4.

The first reinforcing layer 18, for example, is disposed outward in the tire axial direction of the second reinforcing layer 19. The first reinforcing layer 18 can improve stiffness of the bead portions 4 while preventing separation of the second reinforcing layer 19. A distance L3 in the tire radial direction between the outermost end 18e of the first reinforcing layer 18 and the bead baseline BL, for example, is preferably equal to or more than 18% the tire sectional height H (shown in FIG. 1), more preferably equal to or more than 23%, but preferably equal to or less than 35%, more preferably equal to or less than 32%. Note that the bead baseline BL corresponds to a tire axial line that passes a location of a rim diameter (see JATMA) of the standard wheel rim.

In each bead portion 4, at least one of the outermost end 19e of the second reinforcing layer 19 and the outermost end 6e of the turn-up portion 6b, for example, overlaps the recesses 9 in the tire radial direction. The turbulent flow f generated by the recesses 9 effectively dissipates the heat of the surfaces (the bottom surfaces) 9s of the recesses 9. As a result, the heat of the outermost end 19e of the second reinforcing layer 19 and/or the outermost end 6e of the turn-up portion 6b is removed so that damage to these outermost ends 19e and 6e can be suppressed. In the tire 1 according to the present embodiment, both outermost ends 19e and 6e of the second reinforcing layer 19 and the turn-up portion 6b, respectively, overlap the recesses 9 in the tire radial direction. In the present embodiment, the outermost ends 19e of the second reinforcing layers 19 are located outward in the tire radial direction of the outermost ends 6e of the turn-up portions 6b.

The bead reinforcing layers 8 extend inwardly in the tire radial direction of the innermost ends 5i of the bead cores 5. Such bead reinforcing layers 8 can improve durability of the bead portions 4.

In each bead portion 4, a minimum distance Lb between the bead reinforcing layer 8 and the recesses 9, for example, is preferably equal to or more than 1.5 times the depth h of the recesses 9 but preferably equal to or less than 3.5 times. When the minimum distance Lb is equal to or more than 1.5 times the depth h of the recesses 9, stiffness of the bead portions 4 can be maintained high, improving durability thereof. When the minimum distance Lb is equal to or less than 3.5 times the depth h of the recesses 9, heat generated around the bead reinforcing layer 8 can be dissipated through the outer surfaces 4a and 9s effectively. In order to further improve such an effect, the minimum distance Lb is preferably equal to or more than 2.0 times the depth h, but preferably equal to or less than 3.0 times the depth h.

As illustrated in FIG. 1, the tire 1, for example, includes a tread portion 2, a pair of sidewall portions 3, a belt layer 7 disposed in the tread portion 2, a pair of bead apex rubber components 20 each disposed in a respective one of the bead portions 4, a pair of clinch rubber components 21, a pair of sidewall rubber components 22 forming outer surfaces of the pair of sidewall portions 3. The belt layer 7 and the bead apex components 20 may be configured as a conventional manner.

The belt layer 7, for example, includes a plurality of belt plies of steel belt cords. In the present embodiment, the belt layer 7, for example, includes four belt plies 7A to 7D which are superimposed in the tire radial direction.

Each bead apex rubber component 20, for example, extends from a respective one of the bead cores 5 and is disposed between the main portion 6a and the turn-up portion 6b. An outermost end 20e of each bead apex rubber component 20 is located outward in the tire radial direction of the outermost end 8e of the respective one of the bead reinforcing layers 8.

The clinch rubber components 21, for example, are disposed outside in the tire axial direction of the bead reinforcing layers 8 so as to cover the outermost ends 8e of the bead reinforcing layers 8. The clinch rubber components 21, in the present embodiment, form the outer surfaces of the bead portions 4.

The sidewall rubber components 22, for example, extend from a position that is outside in the tire radial direction of the tire maximum width position M to a position that is inside in the tire radial direction of the innermost ends 9i of the recesses 9. In the present embodiment, the recesses 9 are formed on the sidewall rubber components 22.

As illustrated in FIG. 4, the sidewall rubber components 22, in a region where the recesses 9 are formed, overlap the clinch rubber components 21 in the tire radial direction. In the present embodiment, the sidewall rubber components 22 form outer surfaces 4a of the bead portions 4 as well as outer surfaces 3a of the sidewall portions 3.

In the present embodiment, each bead portion 4 is provided with a U-shaped reinforcing layer 24 disposed between the bead reinforcing layer 8 and the carcass 6. The U-shaped reinforcing layer 24, for example, includes a cord ply that includes a plurality of steel cords or organic fiber cords coated with a topping rubber.

The U-shaped reinforcing layer 24, in the present embodiment, extends along the carcass 6 so as to prevent the bead reinforcing layer 8 from contacting with the carcass. The U-shaped reinforcing layer 24 according to the present embodiment includes a first portion 24a extending along the main portion 6a and a second portion 24b extending along the turn-up portion 24b. An outermost end 24e in the tire radial direction of the second portion 24b, for example, is located outward in the tire radial direction of the innermost ends 9i of the recesses 9. Thus, the second portion 24b overlaps the recesses 9 in the tire radial direction, and damage of the second portion 24b can also be prevented by cooling.

Although some preferred embodiments of the present disclosure have been described in detail above, the present disclosure is not limited to the above-mentioned specific embodiments, but can be modified various aspects within the scope of the claims.

EXAMPLE

Pneumatic tires for heavy-duty vehicle of size 275/80R22.5 with the basic structure of FIG. 1 were prototyped based on the specifications in Tables 1 and 2. Then, durability performance, rolling resistance performance, and temperature of the outer surface of the bead portions of each tire were tested. The common specifications and test methods for each tire are as follows.

Rim size: 22.5×8.25

The examples in Table 1 have the same distance Lb with each other. The examples in Table 2 have the same distance Lb+h with each other. The examples in Tables 1 and 2 have the same P and w with each other.

Durability Test:

Each test tire was run on a drum tester under the following conditions, and the mileage until either one of the bead portions was damaged was measured. The test results are shown in Tables 1 and 2 by an index with Ref 1 as 100. The larger the number, the better.

Internal tire pressure: 1075 kPa
Tire load: 81.28 kN
Speed: 20 km/h

Rolling Resistance Performance and Outer Surface Temperature Test:

After running for one hour under the following conditions using a rolling resistance tester, rolling resistance of each test tire and the temperature of the outer surfaces of the bead portions were measured. The test results of rolling resistance performance are shown in Tables 1 and 2 by an index with Ref 1 as 100. The test results of the temperature of the outer surfaces are shown in Tables 1 and 2 by the difference from the temperature of Ref 1. The smaller the number, the better.

Internal tire pressure: 850 kPa
Tire load: 27.09 kN
Speed: 80 km/h

TABLE 1

|  | Ref. 1 | Ref. 2 | Ex. 1 | Ex. 2 | Ex. 3 | Ex. 4 | Ex. 5 | Ex. 6 |
| --- | --- | --- | --- | --- | --- | --- | --- | --- |
| La (mm) | −5 | 0 | 3 | 10 | 12 | 5 | 5 | 5 |
| h (mm) | 2.0 | 2.0 | 2.0 | 2.0 | 2.0 | 0.5 | 7.0 | 3.0 |
| P/h | 7.0 | 7.0 | 7.0 | 7.0 | 7.0 | 7.0 | 7.0 | 7.0 |
| Durability [score] | 100 | 101 | 110 | 110 | 107 | 106 | 107 | 110 |
| Rolling resistance [index] | 100 | 102 | 92 | 93 | 95 | 94 | 95 | 93 |
| Bead outer surface temperature [deg. C.] | — | 0.2 | −5.0 | −4.8 | −4.1 | −3.9 | −4.1 | −4.8 |

TABLE 2

|  | Ex. 7 | Ex. 8 | Ex. 9 | Ex. 10 | Ex. 11 | Ex. 12 | Ex. 13 |
| --- | --- | --- | --- | --- | --- | --- | --- |
| La (mm) | 5 | 5 | 5 | 5 | 5 | 5 | 5 |
| h (mm) | 2.0 | 2.0 | 2.0 | 7.0 | 7.0 | 7.0 | 7.0 |

TABLE 2-continued

|  | Ex. 7 | Ex. 8 | Ex. 9 | Ex. 10 | Ex. 11 | Ex. 12 | Ex. 13 |
|---|---|---|---|---|---|---|---|
| P/h | 0.5 | 40 | 10 | 1 | 1.5 | 3.5 | 4 |
| Durability [score] | 107 | 108 | 110 | 107 | 108 | 110 | 108 |
| Rolling resistance [index] | 95 | 95 | 92 | 95 | 92 | 94 | 95 |
| Bead outer surface temperature [deg. C.] | −3.8 | −4.1 | −4.8 | −3.8 | −4.8 | −4.8 | −4.1 |

As shown in Tables 1 and 2, the tires of the examples are excellent in durability performance. In addition, the tires of the examples have a low outer surface temperature and are also excellent in rolling resistance performance.

What is claimed is:

1. A pneumatic tire comprising:
   a pair of bead portions each having a respective bead core therein;
   a carcass extending between the pair of bead portions, the carcass comprising a carcass ply of cords comprising a main portion extending between the bead cores and a pair of turn-up portions turned up around the bead cores from inside to outside in a tire axial direction; and
   a pair of bead reinforcing layers being disposed outward in the tire axial direction of the pair of turn-up portions in the pair of bead portions such that the pair of bead reinforcing layers extend in a tire radial direction so as to cover outermost ends in a tire radial direction of the pair of turn-up portions, wherein
   an outer surface in the tire axial direction of at least one of the pair of bead portions is provided with a recess row comprising a plurality of recesses spaced in a tire circumferential direction, wherein in a tire side view, each recess is formed into a rectangular shape and in each recess, a ratio (r/w) of a length (r) in the tire radial direction of the recess to a length (w) in the tire circumferential direction of the recess is in a range from 0.25 to 0.55 and
   in the at least one of the pair of bead portions, an outermost end of the bead reinforcing layer is located outwardly in the tire radial direction of outermost ends of the plurality of recesses.

2. The pneumatic tire according to claim 1, wherein the pair of bead reinforcing layers comprises a nylon cord ply that comprises a plurality of nylon cords coated with a topping rubber.

3. The pneumatic tire according to claim 1, wherein the plurality of recesses is spaced at a regular interval in the tire circumferential direction.

4. The pneumatic tire according to claim 1, wherein a depth h of the plurality of recesses is in a range from 1.0 to 5.0 mm.

5. The pneumatic tire according to claim 1, wherein the recess row is located inwardly in the tire radial direction of a tire maximum width position.

6. The pneumatic tire according to claim 1, wherein a ratio (P/h) of a pitch (P) in the tire circumferential direction of the plurality of recesses to a depth (h) of the plurality of recesses is in a range from 1.0 to 30.0.

7. The pneumatic tire according to claim 1, wherein in the at least one of the pair of bead portions, a distance in the tire radial direction between the outermost end of the bead reinforcing layer and the outermost ends of the plurality of recesses is equal to or more than 3.0 mm.

8. The pneumatic tire according to claim 1, wherein
   each of the pair of bead reinforcing layers comprises a first reinforcing layer and a second reinforcing layer, and
   an outermost end in the tire radial direction of the second reinforcing layer is located inwardly in the tire radial direction of an outermost end in the tire radial direction of the first reinforcing layer.

9. The pneumatic tire according to claim 8, wherein in the at least one of the pair of bead portions, the outermost end of the second reinforcing layer or the outermost end of the turn-up portion overlaps the plurality of recesses in the tire radial direction.

10. The pneumatic tire according to claim 8, wherein the first reinforcing layer is disposed outwardly in the tire axial direction of the second reinforcing layer.

11. The pneumatic tire according to claim 1, wherein
    the recess row comprises an outer recess row and an inner recess row located inwardly in the tire radial direction of the outer recess row, and
    a plurality of recesses of the outer recess row is staggered in the tire circumferential direction with respect to a plurality of recesses of the inner recess row.

12. The pneumatic tire according to claim 11, further comprising
    a pair of sidewall rubber components, and
    a pair of clinch rubber components disposed radially inwardly of the pair of sidewall rubber components and harder than the sidewall rubber components, the pair of clinch rubber components being partially disposed inwardly in the tire axial direction of the pair of sidewall rubber components so as to overlap the pair of sidewall rubber components in the tire radial direction, wherein
    in the at least one of the pair of bead portions, the outer recess row and the inner recess row are formed on the sidewall rubber component.

13. The pneumatic tire according to claim 12, wherein the outer recess row and the inner recess row are formed within a region where the sidewall rubber component and the clinch rubber component overlap with each other in the tire radial direction.

14. The pneumatic tire according to claim 13, wherein the recess row consists of only the outer recess row and the inner recess row.

15. The pneumatic tire according to claim 1, wherein the pneumatic tire is a heavy-duty pneumatic tire.

16. The pneumatic tire according to claim 1, wherein in the at least one of the pair of bead portions, a minimum distance Lb between the bead reinforcing layer and the recesses is in a range from 1.5 to 3.5 times a depth h of the recesses.

17. The pneumatic tire according to claim 16, wherein minimum distance Lb is in a range from 2.0 to 3.0 times the depth h.

18. The pneumatic tire according to claim 1, further comprising a pair of sidewall rubber components, and a pair of clinch rubber components disposed radially inwardly of the pair of sidewall rubber components and harder than the sidewall rubber components, the pair of clinch rubber components being partially disposed inwardly in the tire axial direction of the pair of sidewall rubber components so as to overlap the pair of sidewall rubber components in the tire radial direction, wherein in the at least one of the pair of bead portions, the recess row is formed on the sidewall rubber component.

19. The pneumatic tire according to claim 18, wherein the recess row is formed within a region where the sidewall rubber component and the clinch rubber component overlap with each other in the tire radial direction.

\* \* \* \* \*